Nov. 10, 1931. J. T. MOORE 1,830,911
CREEPER ATTACHMENT FOR TRACTOR WHEELS
Original Filed Dec. 27, 1926  3 Sheets-Sheet 2
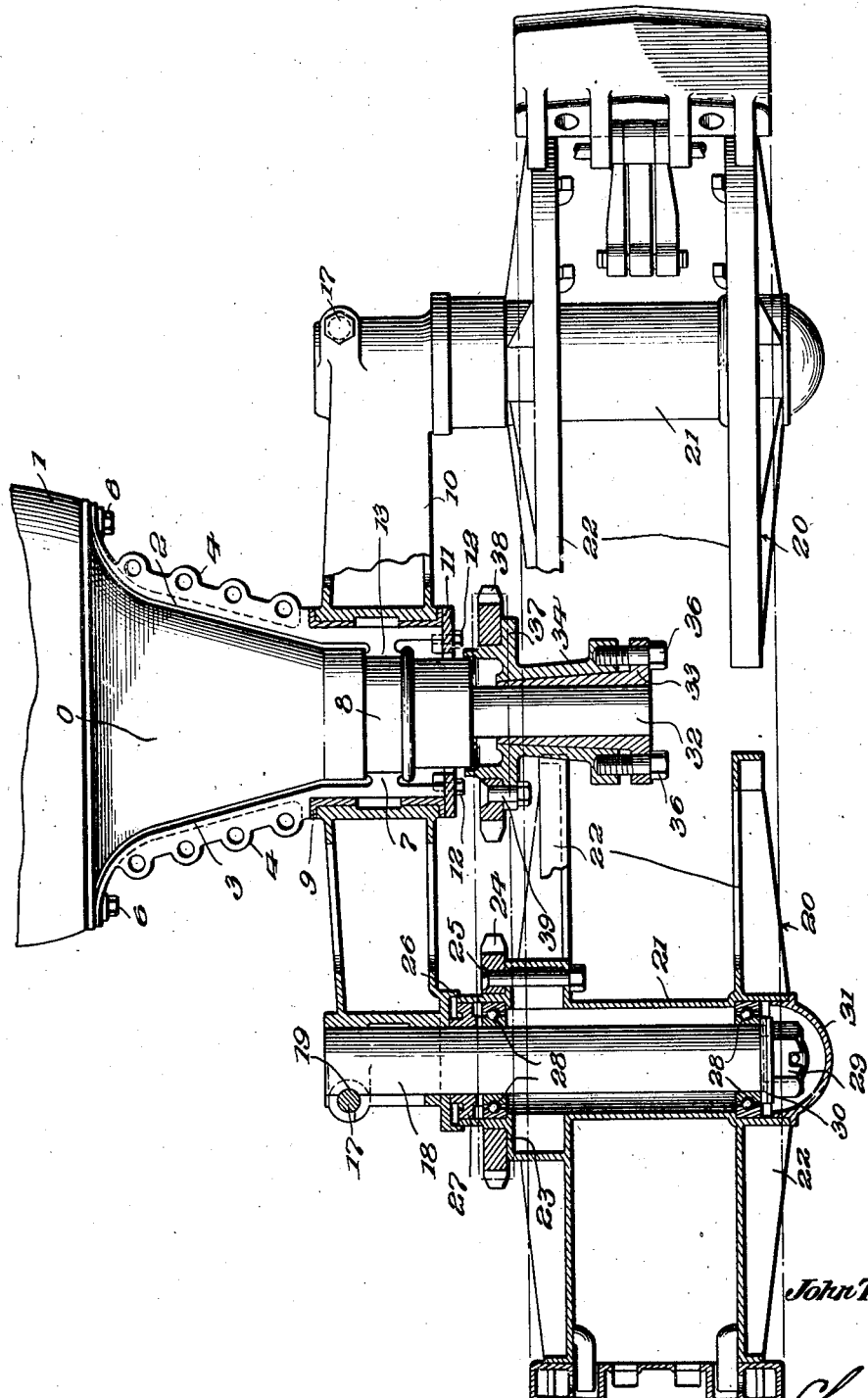

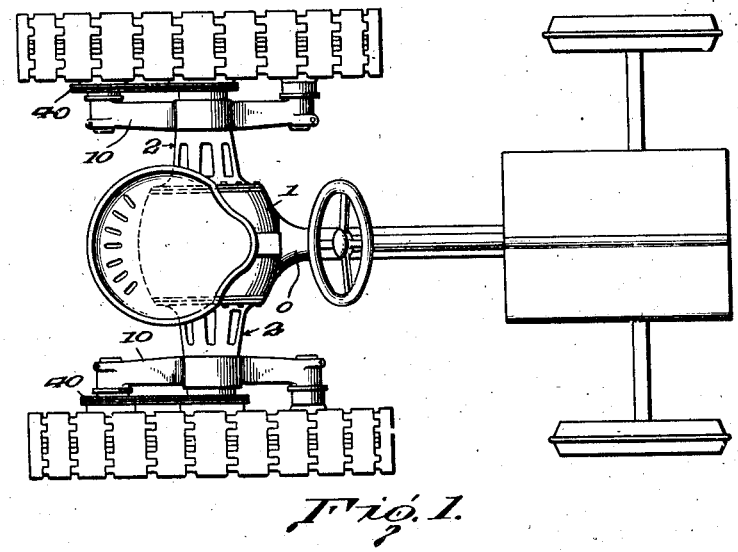
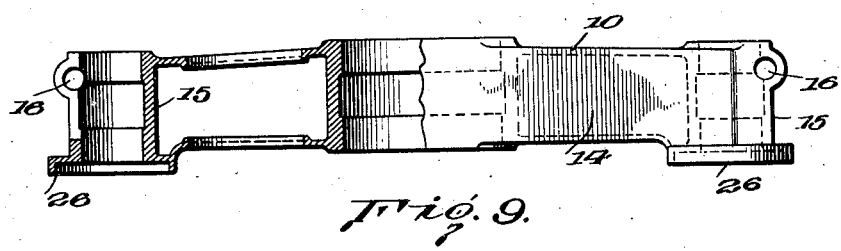
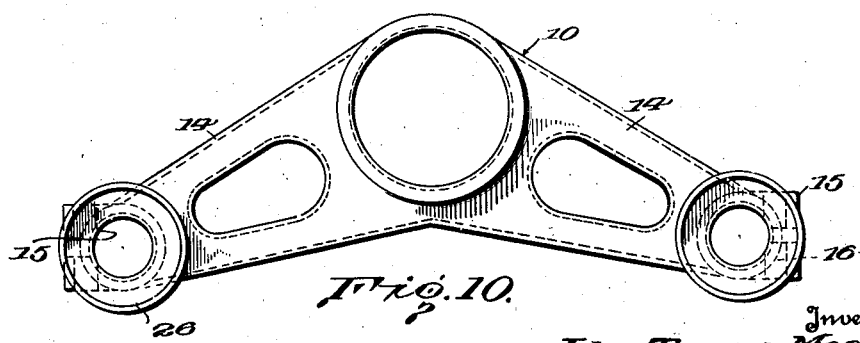

Nov. 10, 1931.  J. T. MOORE  1,830,911
CREEPER ATTACHMENT FOR TRACTOR WHEELS
Original Filed Dec. 27, 1926  3 Sheets-Sheet 3
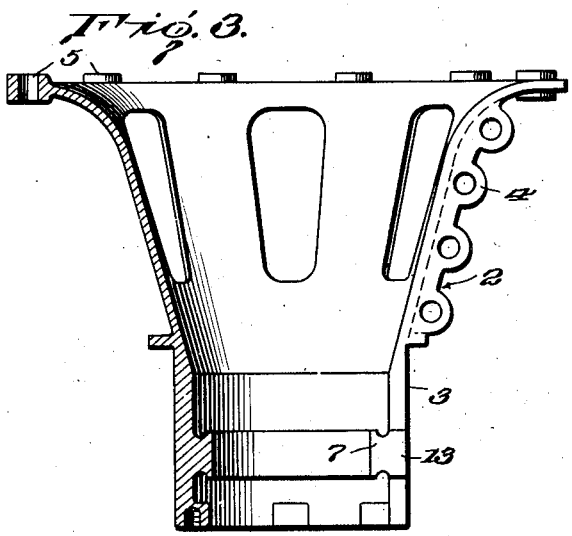
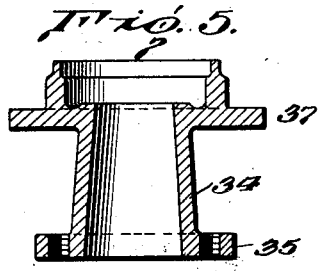
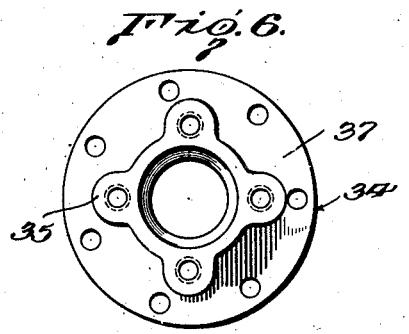
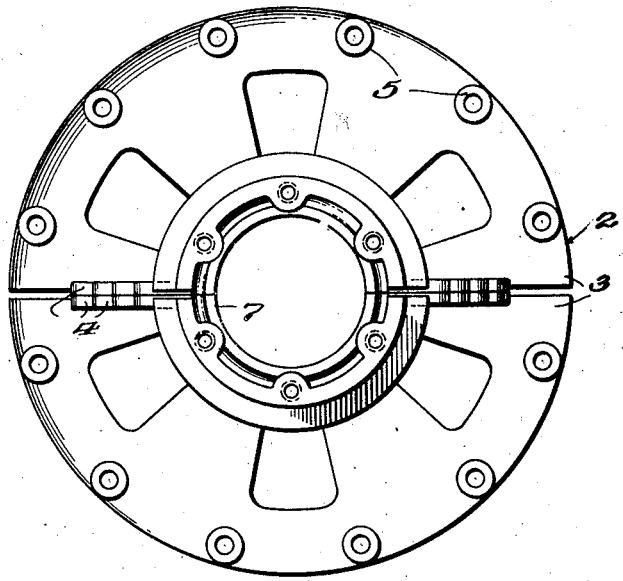
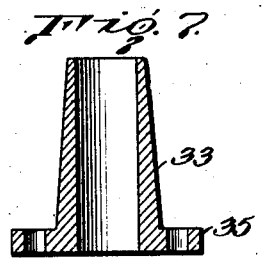
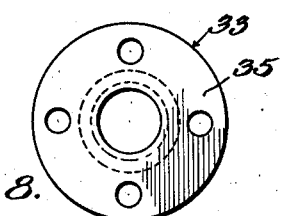
Inventor
John Turner Moore, Patented Nov. 10, 1931

1,830,911

UNITED STATES PATENT OFFICE

JOHN TURNER MOORE, OF READING, PENNSYLVANIA, ASSIGNOR, BY MESNE ASSIGNMENTS, TO REX-WATSON CORPORATION, OF CANASTOTA, NEW YORK, A CORPORATION OF NEW YORK

CREEPER ATTACHMENT FOR TRACTOR WHEELS

Original application filed December 27, 1926, Serial No. 157,398. Divided and this application filed July 22, 1929. Serial No. 380,007.

This invention relates to improvements in endless tracks or creeper tread devices for tractors which may be simply and readily attached in a strong manner to a tractor chassis in substitution for the usual rear or driving wheels of the vehicle.

One of the primary objects of the present invention is to provide a creeper device which may be substituted for the rear wheels of a tractor, the device being so designed that it may be readily mounted on the rear axle housings, upon removal of the rear wheels of the tractor, and furnish endless track means for the latter.

Another object of the invention is to provide a novel sleeve adapted to be mounted upon and engage one of the rear axle housings of the tractor; this sleeve consisting of a plurality of sections properly perforated so as to be readily secured to the differential casing by the same screws employed to join the rear axle housing and differential casing, said sleeve being provided with a journal.

A further object is to furnish a device of this character with a specially formed beam, pivoted intermediate its ends on the journal of the sleeve, and having its ends extending downwardly from the journal to permit the employment of relatively small wheels for the endless track.

Another object is to provide a beam of this character with detachable stationary axles to accommodate the wheels on which the endless track is mounted.

A still further object is to provide an attachment for the rear axle of the tractor, this attachment designed to be substituted for one of the ordinary rear wheels, and to carry a driving member from which the power of the axle is transmitted to one of the wheels of the endless tread or track.

With these and other objects in view, the present invention consists in certain novel details of construction and combinations and arrangement of parts, all as will hereinafter be more fully described and the novel features thereof particularly pointed out in the appended claims.

In the accompanying drawings,

Figure 1 is a top plan view of a tractor having the improved creeper device mounted upon and engaging the rear axle housings and taking the place of the removed ordinary rear wheels of the tractor.

Fig. 2 is a plan view partly broken away, and partly in horizontal section, of one of the creeper devices, shown attached to the ordinary differential and axle housing of the tractor, which are indicated in outline.

Fig. 3 is a plan view partly in longitudinal section of one-half of one of the sleeves which is adapted for engagement with one of the rear axle housings.

Fig. 4 is an elevation of one of these sleeves.

Fig. 5 is a longitudinal sectional view of the outer part of a hub member to be attached to the rear axle projecting beyond its housing in place of the ordinary rear wheel hub.

Fig. 6 is an elevation of this hub member.

Fig. 7 is a longitudinal sectional view of the inner member of the hub.

Fig. 8 is an elevation of the same.

Fig. 9 is a top plan view partly in longitudinal section of one of the beams to which the chain wheels are attached.

Fig. 10 is a side elevation of this beam.

In Fig. 1, as previously stated, a tractor is illustrated with its usual rear axle housings, o, o and differential casing 1; the rear wheel of the tractor being removed, and sleeve 2, 2, as shown, mounted upon and engaging said housings, each of said sleeves being of conical form, (see Fig. 2) and consisting of two sections 3 having apertured flanges 4 to receive the bolts employed to secure the sections together. The sleeve 2, (see Figs. 3 and 4) is provided at its flared end with apertured bosses 5, the apertures of which are spaced to register with the screw holes of the differential casing 1, and screws 6 of slightly greater length than the original equipment serve to anchor and support the inner flared end of the split sleeve sections 3, 3, as well as to hold the rear axle housing o in assembly with the differential casing 1. Sections 3, 3, assembled in sleeve form by bolts passing through their flanges 4 are supported at their outer ends by means of the internal flanges 7 which constitute an annulus clamped tightly upon the usual machined channel portion 8 of the housing o. The portions of the sleeve sections 3, 3, intermediate the flared end and the flange 7, are spaced from the surface of the rear axle housing o, and the irregularities common to the external surfaces of such housings therefore incur no requirement of fitting or machining for the installation of the present attachment. The outer end of the sleeve is cylindrical to receive the L-shaped bearing rings 9 forming a journal for the beam 10. A retaining ring 11 is secured to the sleeve by screws 12, and it acts to hold the bearing rings and beam on the hub portion 13 of the sleeve.

The beam, (see Figs. 2, 9 and 10) is preferably cast hollow to reduce the weight, and its ends diverge downwardly as shown at 14 in Fig. 10. Due to this downward inclination of the ends of the beam, smaller chain wheels may be employed than if the beam were made straight.

Each extremity of the beam is shaped to form a split sleeve 15 having bolt holes 16 to accommodate the bolts 17, used in securing the chain wheel axles 18, to the beam. In order to prevent any axial movement of the axle, the latter is notched at 19, and the bolt occupies this notch.

A chain wheel 20 is mounted on each of the axles 18, and this chain wheel consists of an intermediate hub 21, and a pair of discs or circular webs 22. Either the front or rear wheel may be used as the driving member, and the wheel employed for this purpose is provided with a seat 23 to receive a sprocket wheel 24, which may be detachably secured in place by bolts 25.

Each end of the beam 10 has an outwardly extending annular flange 26 to receive the inner end of the hub, and an oil retaining ring 27 is arranged in the hub at this point. Located between the wheel and the axle, are bearings 28 on which the wheel revolves. The wheels are secured on the axles by nuts or the like 29, and an ordinary washer 30 is placed between the nut and the outer one of the ball-bearings 28. A hub cap 31 completes the assembly.

For the purpose of driving one of the wheels 20 from the axle 32 of the tractor, I provide the latter with an inner hub member 33 (see Figs. 7 and 8), which is of conical formation and enters an outer hub member 34 of flared shape. The member 33 may be keyed to the axle in any suitable manner, and both the inner and outer hub members have apertured flanges 35 to receive screws 36 that are employed in drawing the two members together to effectively wedge them. The outer hub member (see Figs. 5 and 6) is provided at its inner end with an L-shaped flange 37, forming a seat for a sprocket wheel 38, the latter and the flange 37 being apertured to receive bolts 39 employed in detachably connecting the sprocket wheel to the hub.

As shown in Fig. 1, a sprocket chain 40 connects the sprocket wheels 38 and 24, so as to drive one of the chain wheels 20 from the axle of the tractor.

The chain designed to be employed with this mechanism may be used either as a "trailer" or a "tractor" chain, in the latter case, power being applied as indicated above. However, it will be obvious to those skilled in the art, that the chain forming part of the present invention may be used for other purposes, and in other environments than that disclosed herein.

This is a divisional application covering features heretofore disclosed in applicant's application Serial No. 157,398, filed December 27, 1926.

What is claimed is:

1. A creeper attachment for installation on a tractor of the type having a differential housing and a rear axle housing bolted to each side thereof, said attachment comprising a pair of brackets adapted to be secured together in sleeve formation around a rear axle housing with their outer ends tightly clamped upon the outer end of said rear axle housing and their inner ends secured to the differential housing by the bolts which secure the rear axle housing thereto, a beam intermediately pivoted upon said brackets, and load supporting means carried at the ends of the beam.

2. A creeper attachment for installation on a tractor of the type having a differential housing and a rear axle housing bolted to each side thereof, said attachment comprising a pair of brackets adapted to be secured together in sleeve formation around a rear axle housing with their outer ends tightly clamped upon the outer end of said rear axle housing and their inner ends secured to the differential housing by the bolts which secure the rear axle housing thereto, a bearing supporting portion formed on the outer ends of said brackets adjacent the point at which they are clamped upon the outer end of the rear axle housing, a bearing member mounted on said supporting portion, a beam intermediately pivoted upon said bearing, and load supporting means carried at the ends of said beam.

JOHN TURNER MOORE.